(12) United States Patent
Darr

(10) Patent No.: US 7,856,411 B2
(45) Date of Patent: Dec. 21, 2010

(54) SOCIAL NETWORK AWARE PATTERN DETECTION

(75) Inventor: Timothy Paul Darr, Bristow, OK (US)

(73) Assignee: 21st Century Technologies, Inc., Austin, TX (US)

( * ) Notice: Subject to any disclaimer, the term of this patent is extended or adjusted under 35 U.S.C. 154(b) by 980 days.

(21) Appl. No.: 11/673,816

(22) Filed: Feb. 12, 2007

(65) Prior Publication Data

US 2007/0226248 A1 Sep. 27, 2007

Related U.S. Application Data

(60) Provisional application No. 60/784,438, filed on Mar. 21, 2006.

(51) Int. Cl.
  *G06F 17/00* (2006.01)
  *G06N 5/00* (2006.01)
  *G06N 5/02* (2006.01)
(52) U.S. Cl. .......................................... 706/45; 706/62
(58) Field of Classification Search .................... 706/45
  See application file for complete search history.

(56) References Cited

U.S. PATENT DOCUMENTS

| 7,505,876 | B2 * | 3/2009 | Papadimitriou et al. ...... 702/189 |
| 7,530,105 | B2 * | 5/2009 | Gilbert et al. .................. 726/22 |
| 7,689,452 | B2 * | 3/2010 | Lam et al. ...................... 705/10 |
| 7,739,211 | B2 * | 6/2010 | Coffman et al. ............... 706/45 |

OTHER PUBLICATIONS

A statistical approach for phrase location and recognition within a text line: an application to street name recognition El-Yacoubi, M. A.; Gilloux, M.; Bertille, J.-M.; Pattern Analysis and Machine Intelligence, IEEE Transactions on vol. 24, Issue: 2 Digital Object Identifier: 10.1109/34.982898 Publication Year: 2002, pp. 172-188.*
Wise: Hierarchical Soft Clustering of Web Page Search Results Based on Web Content Mining Techniques, Campos, R.; Dias, G.; Nunes, C.; Web Intelligence, 2006. WI 2006. IEEE/WIC/ACM International Conference on Digital Object Identifier: 10.1109/WI.2006.201 Publication Year: 2006, pp. 301-304.*

(Continued)

*Primary Examiner*—Michael Holmes
(74) *Attorney, Agent, or Firm*—Dillon & Yudell LLP

(57) ABSTRACT

Enabling dynamic, computer-driven, context-based detection of social network patterns within an input graph representing a social network. A Social Network Aware Pattern Detection (SNAP) system and method utilizes a highly-scalable, computationally efficient integration of social network analysis (SNA) and graph pattern matching. Social network interaction data is provided as an input graph having nodes and edges. The graph illustrates the connections and/or interactions between people, objects, events, and activities, and matches the interactions to a context. A sample graph pattern of interest is identified and/or defined by the user of the application. With this sample graph pattern and the input graph, a computational analysis is completed to (1) determine when a match of the sample graph pattern is found, and more importantly, (2) assign a weight (or score) to the particular match, according to a pre-defined criteria or context.

44 Claims, 10 Drawing Sheets

OTHER PUBLICATIONS

Efficient phrase-based document indexing for Web document clustering, Hammouda, K.M.; Kamel, M.S.; Knowledge and Data Engineering, IEEE Transactions on vol. 16, Issue: 10 Digital Object Identifier: 10.1109/TKDE.2004.58 Publication Year: 2004, pp. 1279-1296.*

Recognition of handwritten phrases as applied to street name images, Kim, G.; Govindaraju, V.; Computer Vision and Pattern Recognition, 1996. Proceedings CVPR '96, 1996 IEEE Computer Society Conference on Digital Object Identifier: 10.1109/CVPR.1996.517112 Publication Year: 1996, pp. 459-464.*

T. Coffman; "Enabling Network Intrusion Detection by Representing Network Activity in Graphical Form Utilizing Distributed Data Sensors to Detect and Transmit Activity Data"; filed Mar. 4, 2006; U.S. Appl. No. 11/367,944; 69 pgs.

T. Coffman; "Intelligent Intrusion Detection System Utilizing Enhanced Graph-Matching of Network Activity with Context Data"; filed Mar. 4, 2006; U.S. Appl. No. 11/367,943; 70 pgs. 69 pgs.

M. Moy; "Computer Automated Group Detection"; filed Oct. 6, 2006; U.S. Appl. No. 11/539,436; 46 pgs.

T. Coffman; "SNA-Based Anomaly Detection"; filed Nov. 8, 2006; U.S. Appl. No. 11/557,584; 51 pgs.

* cited by examiner

SOCIAL NETWORK AWARE PATTERN DETECTION

PRIORITY CLAIM

Benefit of priority under 35 U.S.C. §119(e) is claimed based on U.S. Provisional Application No. 60/784,438, entitled, "Social Network Aware Pattern Detection," filed on Mar. 21, 2006, which disclosure is incorporated herein by reference.

RELATED APPLICATIONS

The present application is related to the following co-pending U.S. Patent Applications: U.S. patent application Ser. No. 11/367,944 filed on Mar. 4, 2006; U.S. patent application Ser. No. 11/367,943 filed on Mar. 4, 2006; U.S. patent application Ser. No. 11/539,436 filed on Mar. 20, 2006; and U.S. patent application Ser. No. 11/557,584 filed on Apr. 21, 2006. Relevant content of the related applications are incorporated herein by reference.

BACKGROUND OF THE INVENTION

1. Field of the Invention

The present invention relates generally to evaluation of social networks and in particular to computer-implemented evaluation of social networks. Still more particularly, the present invention relates to a method, system and computer program product for computer-implemented pattern analysis within social networks.

2. Description of the Related Art

Social Network Analysis (SNA) is a technique utilized by anthropologists, psychologists, intelligence analysts, and others to analyze social interaction(s) and/or to investigate the organization of and relationships within formal and informal networks such as corporations, filial groups, or computer networks.

SNA typically represents a social network as a graph (referred to as a social interaction graph, communication graph, activity graph, or sociogram). In its simplest form, a social network graph contains nodes representing actors (generally people or organizations) and edges representing relationships or communications between the actors. In contrast with databases and spreadsheets, which tend to facilitate reasoning over the characteristics of individual actors, graph-based representations facilitate reasoning over relationships between actors.

In conventional analysis of these graphs most users search and reason over the graphs visually, and the users are able to reason about either the individual actors or the network as a whole through graph-theoretic approaches. Social Network Analysis (SNA) was developed to describe visual concepts and truths between the observed relationships/interactions. In conventional social network analysis, most graphs are analyzed by visual search and reasoning over the graphs. Analysts are able to reason about either individual actors or the network as a whole through various approaches and theories about structure, such as the small-worlds conjecture. Thus, SNA describes visual concepts and truths between the observed relationships and actors.

Analysts use certain key terms or characterizations to refer to how actors appear to behave in a social network, such as gatekeeper, leader, and follower. Designating actors as one of these can be done by straightforward visual analysis for static (i.e., non-time varying graphs of past activity). However, some characterizations can only be made by observing a graph as the graph changes over time. This type of observation is significantly harder to do manually.

Thus, SNA metrics were developed to distill certain aspects of a graph's structure into numbers that can be computed automatically. Metrics can be computed automatically and repetitively for automated inspection. Decision algorithms, such as neural networks or hidden Markov models may then make the determination if a given actor fills a specific role. These algorithms may be taught to make the distinction with labeled training data.

With conventional SNA techniques, there is presently no implementation that combines SNA with pattern matching techniques in a manner that is tightly integrated and which provides a true context within which to evaluate the SNA data. This specific combination and use thereof for a resulting context-based analysis/evaluation have not been provided with conventional SNA techniques and SNA systems. Thus, the present invention recognizes that a need exists for a more robust and automatic method for enabling users to computationally analyze social networks to determine/detect context-based patterns within social interaction data.

SUMMARY OF EMBODIMENTS

Disclosed are a method, system, and computer program product for enabling dynamic, computer-driven, context-based detection of social network patterns within an input graph representing a social network. A Social Network Aware Pattern Detection (SNAP) system and method is provided and utilizes a highly-scalable, computationally efficient integration of social network analysis (SNA) and graph pattern matching. Social network interaction data is provided as an input graph having nodes and edges. The graph illustrates the connections and/or interactions between people, objects, events, and activities, and matches the interactions to a context. A sample graph pattern of interest is identified and/or defined by the user of the application. With this sample graph pattern and the input graph, a computational analysis is completed to (1) determine when a match of the sample graph pattern is found, and more importantly, (2) assign a weight (or score) to the particular match, according to a pre-defined criteria or context.

In one embodiment, the context may be a preset number of degrees of separation between one node in the detected graph and another node/point of interest within the overall social network. In another embodiment, a particular social role (e.g., gatekeeper) may be defined for one of the participants within the social network based on the connection of person, events, activities, etc. to the node representing that individual. Also, the SNA and graph pattern matching performed on the input graph may utilize pre-defined SNA metrics.

The above as well as additional objectives, features, and advantages of the present invention will become apparent in the following detailed written description.

BRIEF DESCRIPTION OF THE DRAWINGS

This invention is described in a preferred embodiment in the following description with reference to the drawings, in which like numbers represent the same or similar elements, as follows.

DETAILED DESCRIPTION OF PREFERRED EMBODIMENTS

Figure 1:
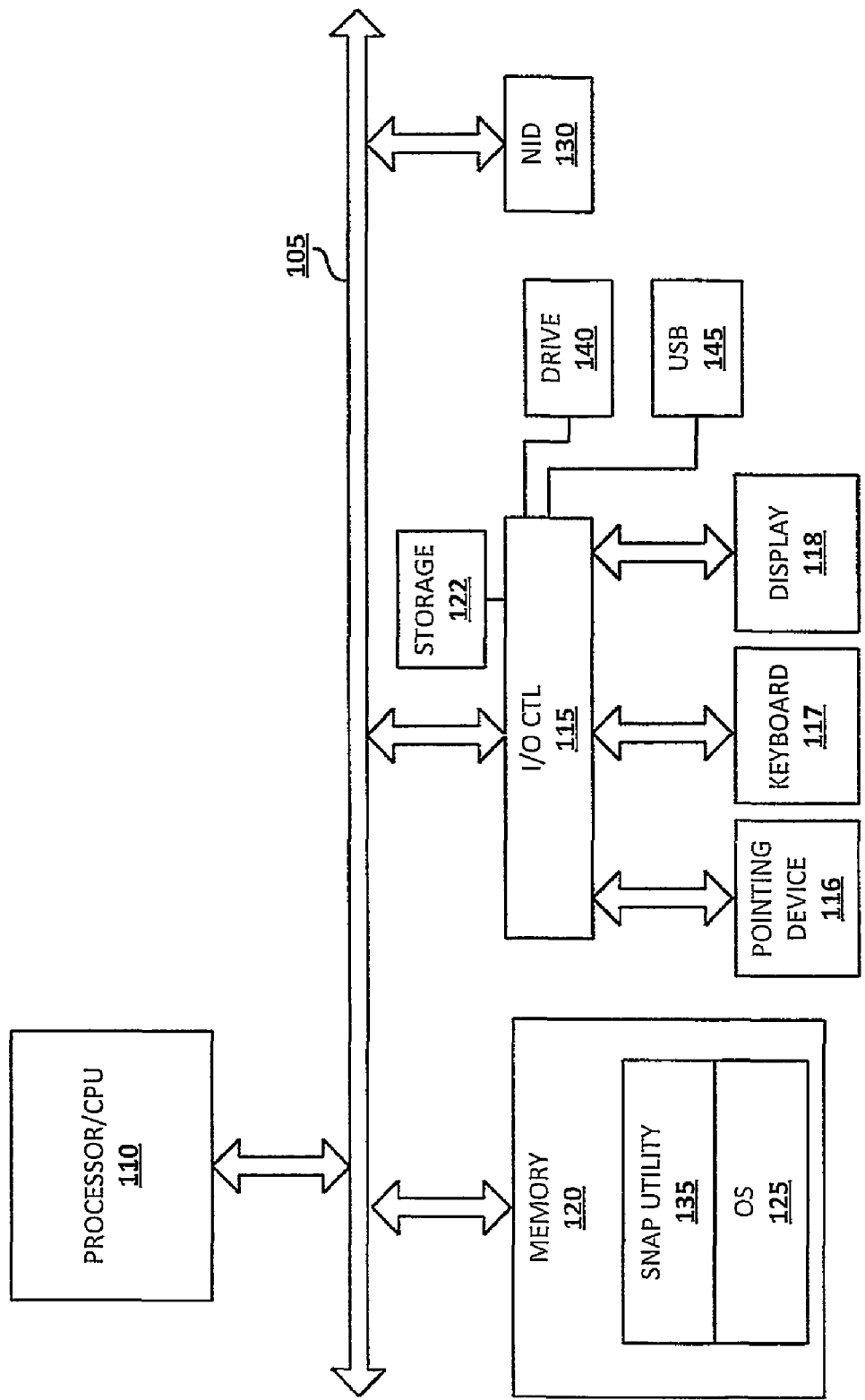
FIG. 1 is a block diagram representation of a data processing system within which the various analytical and computational features of the invention may advantageously be implemented, in accordance with one embodiment.

The embodiments of the present invention provide a Social Network Aware Pattern Detection (SNAP) system and method, which utilizes a highly-scalable, computationally efficient integration of social network analysis (SNA) and graph pattern matching. Social network interaction data is provided as an input graph having nodes and edges. The graph illustrates the connections and/or interactions between people, objects, events, and matches them to a context. A sample graph pattern of interest is identified and/or defined by the user of the application. With this sample graph pattern and the input graph, a computational analysis is completed to (1) determine when a match of the sample graph pattern is found, and more importantly, (2) assign a weight (or score) to the particular match, according to a pre-defined criteria or context.

In one embodiment, the context may be a preset number of degrees of separation between one node in the detected graph and another node/point of interest within the overall social network. In another embodiment, a particular social role (e.g., gatekeeper) may be defined for one of the participants within the social network based on the connection of person, events, activities, etc. to the node representing that individual. Also, the SNA and graph pattern matching performed on the input graph may utilize pre-defined SNA metrics.

SNAP applies to any graph-pattern matching algorithm where the objective is to find sub-patterns within a graph. The methodology enhances the sub-graph ismorphism problem (SGISO), which is described in F. Harary's *Graph Theory*, Addison-Wesley, 1971, incorporated herein by reference. SNAP (i.e., the SNAP utility) ranks retrieved graph matched patterns using SNA-based techniques. SNAP provides a framework for integrating group detection, SNA and graph pattern matching, through an SNA-based ranking of retrieved graph patterns, where the criteria for matching an entity include SNA metrics, roles or features. As utilized herein, a metric is an attribute of a node in a graph, or a subgraph within the graph. Also, a social network role is a node in the graph that plays a prominent and/or distinguishing role in the graph, such as a gatekeeper. Group detection mechanisms/methodologies may include the Best Friends (BF) and Auto Best Friends (Auto BF) Group Detection methodologies, which are described in related patent application, Ser. No. 11/557,584, incorporated herein by reference.

The embodiments of the invention provides several features including: (1) Integration of SNA metrics into graph pattern matching; (2) Integration of SNA metric intervals to constrain the search; and (3) Integration of other SNA constructs, such as groups, into graph pattern matching. With the integration of SNA metrics into graph pattern matching, any existing or future SNA metric is easily incorporated into a graph matching algorithm when determining if a node in the graph matches a node in the pattern. The pattern match criteria specify a predicate defined over SNA metric values. Examples of SNA metrics supported include, but are not limited to, the following: average cycle length, average path length, centrality measures, circumference, clique measures, clustering measures, degree, density, diameter, girth, number of nodes, radius, radiality, and others. Descriptions of this listing of SNA metrics as well as other possible SNA metrics that may be utilized within embodiments of the invention are provided in Wasserman, S. & Faust, K.'s *Social Network Analysis: Methods and Applications Structural Analysis in the Social Sciences*, Cambridge University Press, 1994. Relevant content of that reference is incorporated herein by reference. The actual group of SNA metrics utilized may vary depending on implementation.

The description of the invention is presented with multiple sections and subsections, delineated by corresponding headings and subheadings. The headings and subheadings are intended to improve the flow and structure of the description, but do not provide any limitations on the invention. The content (i.e., features described) within any one section may be extended into other sections. Further, functional features provided within specific sections may be practiced individually or in combination with other features provided within other sections.

More specifically, labeled Section A provides a structural layout for an example data processing system, which may be utilized to perform the SNAP analysis functions described herein. Labeled Section B describes software-implemented features of SNAP utility and provides an example social network graph (also referred to as the input graph), along with a description of SNA and SNA metrics, which enhance the operation of SNAP utility. Labeled Section C describes integrating SNA roles into pattern matching. Finally, Labeled Section D describes inexact SNA metric calculations.

A. Data Processing Systems As Snap Device

Generally, within the following descriptions of the figures, similar elements are provided similar names and reference numerals as those of the previous figure(s). Where a later figure utilizes the element in a different context or with different functionality, the element is provided a different leading numeral representative of the figure number (e.g., 2xx for FIG. 2 and 4xx for FIG. 4). The specific numerals assigned to the elements are provided solely to aid in the description and not meant to imply any limitations (structural or functional) on the invention.

The various computational features of the described embodiment of the invention are provided via some sort of processing device which has a mechanism for receiving the SNA data and for analyzing the data according to the methodology described hereinafter. In one embodiment, a SNA pattern detection device, referred to hereinafter as a SNAP device, is provided and comprises several hardware and software components that enable dynamic SNAP detection and analysis, based on (1) received data/information from the social network, (2) pre-defined and/or newly defined SNAP metrics, and/or (3) other user-provided inputs. As further illustrated within FIG. 1 and described below, the SNAP device may be a data processing system, which executes a SNAP utility that completes the specific SNAP detection and analysis functions described below. In one embodiment, as described in details in section B below, SNAP device receives an input social network graph generated via one of (a) an enhanced GMIDS (eGMIDs) process, which is described within co-pending application (Ser. No. 11/367,943). The described eGMIDS methodology may be utilized and the co-pending application is incorporated herein by reference. Regardless of the source, the input graph provides the social network dataset and/or a graph representation of the SNAP dataset from the general network. In another embodiment, the user provides the input social network graph via some input means of the SNAP device. Actual network-connectivity of the SNAP device is not a requirement for the implementation of the invention, and the remainder of the invention is described with reference to a standalone data processing system executing SNAP utility, as illustrated by FIG. 1.

Referring now to FIG. 1, there is depicted a block diagram representation of a data processing system that may be utilized as the SNAP device, in accordance with an illustrative embodiment of the present invention. As shown, data processing system (DPS) 100 comprises one or more processors or central processing units (CPU) 110 connected to memory 120 via system interconnect/bus 105. Also connected to system bus 105 is I/O controller 115, which provides connectivity and control for input devices, pointing device (or mouse) 116 and keyboard 117, and output device, display 118. Additionally, a multimedia drive 140 (e.g., CDRW or DVD drive) and USB (universal serial port) hub 145 are illustrated, coupled to I/O controller. Drive 140 and USB port 145 may operate as both input and output mechanisms. DPS 100 also comprises storage 122, within which data utilized to provide the input graph and the pattern graph (described below) may be stored.

DPS 100 is also illustrated with a network interface device (NID) 130 with which DPS 100 connects to another computer device or computer network. NID 130 may comprise a modem and/or a network adapter, for example, depending on the type of network and connection method to the network. It is however understood that application of the various processes of the invention may occur within a DPS 100 that is not connected to an external network, but receives the input data (e.g., input social network graph) via some other input means, such as a CD/DVD medium within multimedia input drive 140, a thumb drive inserted in USB port 145, user input via keyboard 117, or other input device.

Those of ordinary skill in the art will appreciate that the hardware depicted in FIG. 1 is a basic illustration of a data processing system and may vary. Thus, the depicted example is not meant to imply architectural limitations with respect to the present invention.

B. Snap Utility, Social Network and Pattern Graphs, SNA Metrics

Notably, in addition to the above described hardware components of DPS 100, various features of the invention are provided as software code stored within memory 120 or other storage (not shown) and executed by CPU 110. Thus, located within memory 120 and executed on CPU 110 are a number of software components, including operating system (OS) 125 (e.g., Microsoft Windows®, a trademark of Microsoft Corp, or GNU®/Linux®, registered trademarks of the Free Software Foundation and The Linux Mark Institute) and software applications, of which SNAP utility 135 is shown. In actual implementation, SNAP utility 135 may be loaded on to and executed by any existing computer system to provide the dynamic pattern detection and analysis features within any input social network graph, as further described below.

CPU 110 executes SNAP utility 135 as well as OS 125, which supports the execution of SNAP utility 135. In the illustrative embodiment, several graphical user interfaces (GUI) and other user interfaces are provided by SNAP utility 135 and supported by the OS 125 to enable user interaction with, or manipulation of, the parameters utilized during processing by SNAP utility 135. Among the software code/algorithm provided by SNAP utility 135, which are specific to the invention, are (a) code for enabling the SNA target graph detection, and (b) code for matching known target graphs to an input graph; (b) code for displaying a SNAP console and enabling user setup, interaction and/or manipulation of the SNAP processing; and (c) code for generating and displaying the output of the SNAP analysis in user-understandable format. For simplicity, the collective body of code that enables these various features is referred to herein as SNAP utility 135. According to the illustrative embodiment, when CPU 110 executes OS 125 and SNAP utility 135, DPS 100 initiates a series of functional processes, that enable the above functional processes as well as corresponding SNAP features/functionality described below along with the illustrations of FIGS. 2-11.

SNAP utility 135 processes data represented as a graph, where relationships among nodes are known and provided. Thus, the described embodiment of the invention completes the various SNAP analyses (relationships among interconnected nodes) through use of an input graph representation. The input graph representation provides an ideal methodology because edges define the relationships between two nodes. Relational databases may also be utilized, in other embodiments. In an example graph showing a set of individuals, nodes represent various entities including, but not limited to, computers, people, organizations, objects, and events. Edges link nodes in the graph and represent relationships, such as interactions, ownership, and trust. Attributes store the details of each node and edge, such as a person's name or an interaction's time of occurrence.

Within the description of the invention, a social network is utilized to loosely refer to a collection of communicating/interacting persons, devices, entities, businesses, and the like within a definable social environment (e.g., familial, local, national, and/or global). Within this environment, a single entity/person may have social connections (directly and indirectly) to multiple other entities/persons within the social network, which is ultimately represented as a series of interconnected data points/nodes within an activity graph (also referred to herein as an input social network graph (100). Generation of an example activity graph is the subject of the co-pending application (Ser. No. 11/367,944), whose content has been incorporated herein by reference and a description of features relevant to basic social network analysis is provided in co-pending application (Ser. No. 11/557,584). Thus, the social network described within the invention may also be represented as a complex collection of interconnected data points within a graph.

Figure 2:
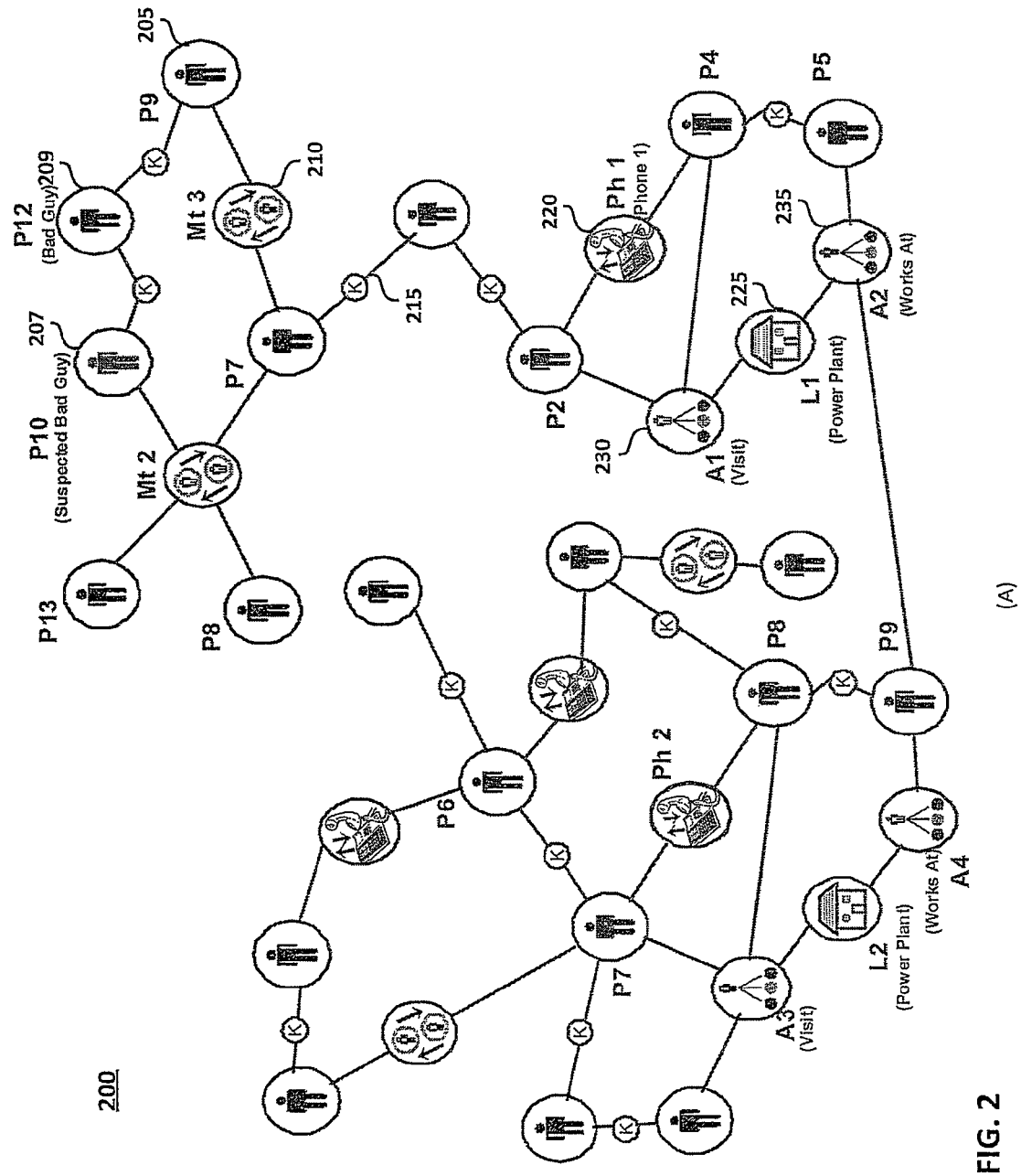
FIG. 2 is a pictorial representation of an example input graph depicting an example social network interaction, which may be analyzed in accordance with one embodiment of the invention.

FIG. 2 illustrates an example social network within which the features of the present invention may advantageously be implemented. Social network 200 is a person-to-person communication and/or interaction network, represented as a graph of nodes connected via edges. As illustrated, each node is represented as an oblong-shaped object with the edges identified as lines connecting the various nodes. In some instances, the interconnection between two nodes involves an intermediary communication device, such as a telephone. Additionally, communication between two nodes may be established via some action of one of the adjoining nodes (persons), such as a visit to a facility.

Within the illustrated graph of social network 200, a vast majority of the nodes represent an identifiable person, object, or thing that communicates, interacts, or supports some other form of activity with another node. Edges connecting each node represent contact with or some other connection/interaction between the two connected nodes. In one embodiment, the edges are weighted to describe how well or how frequent the two nodes interact (e.g., how well the two persons represented as nodes actually know each other or how frequent their contact is). This weighing of the edges may also be used as a factor when analyzing the social network for "events of interest," described in greater details below.

With specific reference now to FIG. 2, social network 200 comprises multiple persons, including example person 205, interacting and/or communicating with each other. These persons (205) interact via a number of different communication means, including via personal exchange 210, K 215 (which represents "knowledge of" or "acquaintance of" or "knows"0 the connected node), and telephone 220. Additionally, other activities of one or more persons (205) are recorded within social network 200, including activities related to several facilities 225 (illustrated as power plants, in this example). Thus, social network 200 also provides an indication of visits 230 to these facilities 225 as well as whether a person (205) is a worker 235 (i.e., works at) one of these facilities 225.

In addition to the multiple persons 205 generally represented within social network 200, social network also provides two "persons of interests," identified as Suspected Bad-Guy 207 and BadGuy 209. These persons of interests are connected, directly or indirectly, to the remaining nodes (persons, facilities, etc) within social network 200 via one or more of the communication/interaction means (person-to-person communication 210, telephone 220, etc.).

The social network illustrated by FIG. 2 is predominantly a person-to-person network. It is understood that the method of communication from one person to another may vary and that some electronic communication mechanism (cell phone, computer, and the like) may be utilized in such communications. Thus, another illustration of the network may encompass the physical devices utilize to complete the various communications. Also, the entities in the social network (or corresponding graph) do not have to be people. That is, the entities represented may be organizations, countries, groups, animals, etc. Regardless of the type of entities, the features of the invention are fully applicable so long as the entities are configured in some form of a social network, or have the characteristics of a social network.

Embodiments of the invention integrate SNA metric intervals to constrain the search within the pattern match predicate, and the use of intervals to constrain or focus the search is supported. One additional feature involves the integration of other SNA constructs, such as groups, into graph pattern matching. With this integration of SNA constructs, in addition to the use of SNA metrics to define the match criteria, the methods of the invention also allows for group membership. Also, a match predicate may require that the node be a member of a group with certain characteristics. Specification of the group may also include the definition of certain SNA or graph metrics, as defined above.

In one embodiment, the SNAP system augments existing graph matching algorithms to include the ability to match nodes against certain SNA roles and positions, such as entities with high centrality measures, communication gateways, cutouts, and reach-ability to other particular entities of interest. This augmentation of graph matching enhances the ability of a user (who may be an analyst or casual user, for example) to filter out irrelevant or benign matches in a computationally efficient way.

Figure 4:
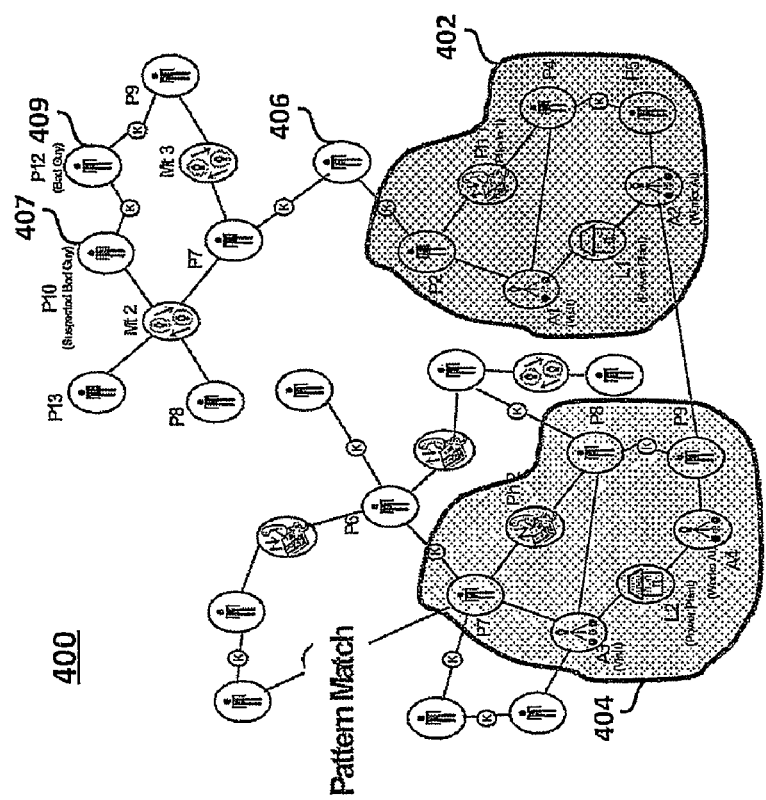
FIG. 4 illustrates an example matching of the graph pattern of FIG. 3 with the input graph of FIG. 2, in accordance with one embodiment of the invention.
Figure 3:
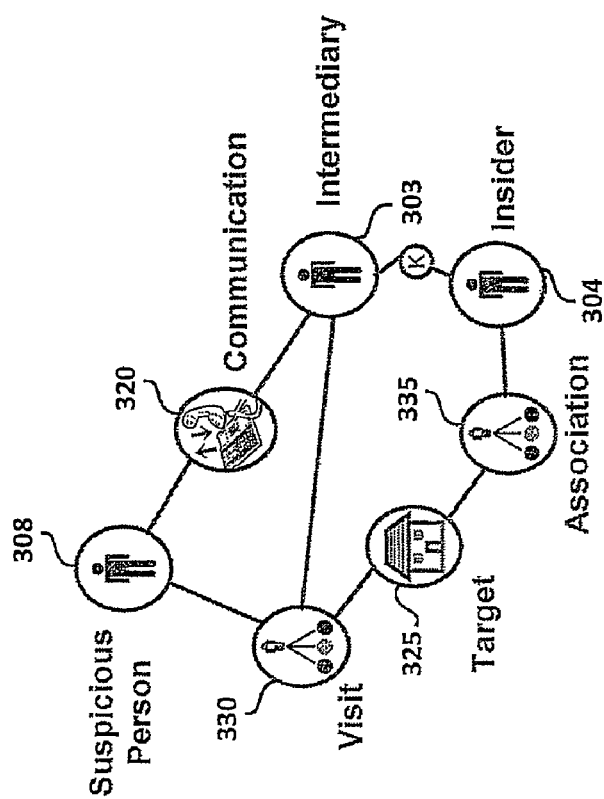
FIG. 3 illustrates an example graph pattern, representing specific interactions that are of interest to potential users, in accordance with one embodiment of the invention.

An example of the approach is provided with reference to FIGS. 3 and 4. According to the example, SNAP is being utilized to identify individuals within a social network 400 in which one member (or node) is connected to a target facility 325 (e.g., a power plant) and in which the network or individuals therein may be targeting the facility for an some malicious undertaking (breach of security protocol, theft, damage to property, disruption of operations, etc.). With this example, suspicious individual 308 (i.e., a person of interest to the user) has arranged a visit 330 to the target facility 325 via an indirect relationship (phone communication 320) with someone (insider 304) that has an association 335 with (e.g., works in) the facility 325. With this description of the possible threat or activity of interest, the pattern graph of FIG. 3 is generated and maintained (e.g., stored) within the evaluation device (DPS 100) for use in analyzing an input graph.

Again, FIG. 3 shows the graph pattern that represents this scenario. As shown, insider 304, who has an association 335 with target facility 325, communicates directly with an intermediary 303, who in turn communicates with suspicious person 308 via telephone communication 320. Suspicious person arranges a visit 330 to the target facility 325. Once the chain is completed, the pattern is established as one that is perhaps of interest to a user. The exact order of the various interactions/communication is not a factor in completing the pattern graph; However, once the SNAP utility initiates its evaluation, the order may be utilized to provided some (contextual) weight in the analysis of matched patterns.

In the illustrated pattern, "Suspicious Person" 308 represents the person that might have malicious intentions (e.g., a known trouble maker or someone with a known grudge against the power plant). "Insider" 304 is the person that has some kind of "Association" 335 with the facility ("Target") 325 and can arrange visits 330. This person may be a worker at the facility 325, for example. "Intermediary" 303 knows both the "Insider" 304 and the "Suspicious Person" 308. According to the embodiments described, the "Insider" 304 may not know the possible harmful motives/intentions of "Suspicious Person" 308. As far as "Insider" 304 knows, "Suspicious Person" 308 is a "friend of a friend" (i.e., intermediary 303). "Suspicious Person" 308 and "Intermediary" 303 are in communication 320 with one another. With this information, SNAP utility is then utilized to figure out who is the "bad guy" (or the most likely bad guy) within input graph 400 (FIG. 4). SNAP utility also rates the level of concern (with respect to the possible threat from the bad guy) on a scale (e.g., from 1-10), using graph matching and enhanced SNA techniques.

Thus, according to the described and illustrative embodiments, the notion of a "bad guy" is not a binary assessment (Y/N); Rather, the level of "badness" or the "threat level" depends on the associations that an entity has, or the social network of which the entity is a member, evaluated within the context of those interactions. For example, a person might be a threat because he is a member of a domestic drug network. A person might also be a threat because he is a member of a gang. An FBI analyst is likely to consider the member of the domestic drug network more of a threat than a military analyst, while the military analyst is likely to consider the member of the terrorist cell the bigger threat. The key point is that the degree of threat level for an entity depends entirely on the context, and ranges from a minimal threat to a severe threat. SNAP allows for rankings based on social network context.

To determine who the "bad guy" is, the user would have to work with a dataset represented as a graph, an example of which is shown in FIG. 4. This input graph 400 includes people, actions, communication events and locations. Using this input graph 400, a user is unable, with current technology, to distinguish a threatening visit to the facility from a benign visit. FIG. 4 illustrates two matches for the pattern 300, one benign match 404 and one threatening match 402, using graph matching techniques. For the visit to be threatening, the visitor (P2, P7) must have some association with one or both of "suspected bad guy" 407 or "bad guy" 409. The visit may also be benign, such as a worker taking a friend for a tour of the plant. The key distinguishing feature in this input dataset between the benign pattern match 404 and the threatening pattern match 402 is the indirect relationships between the visitor (P2) and potential "bad guys" (407, 409). Using the SNAP utility, such characteristics may be automatically identified from each of these patterns. The utility then ranks the pattern matches based on these characteristics, in real time, as an automated service to the user.

Figure 5:
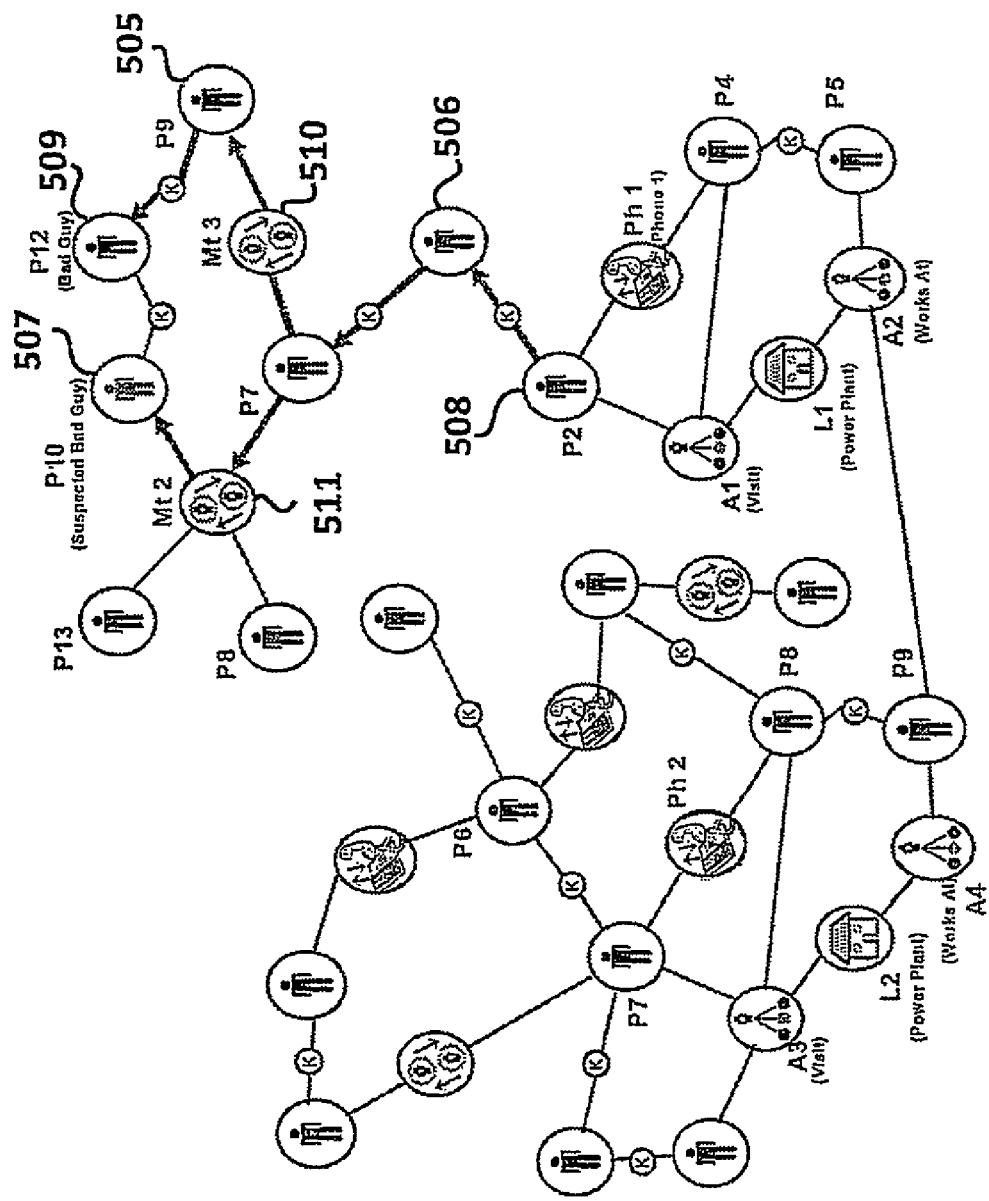
FIG. 5 illustrates paths of communication between a matched pattern and a node (or person) of interest within the larger input graph of FIG. 2, in accordance with one embodiment of the invention.

The embodiments of the invention provide two ways that SNA-based pattern matching is able to support the user (or analyst). First, using SNAP, the user is able to add the criteria (or take the criteria from an SNA library) that the visitor (P2) is within a certain path length to a known "bad guy" (407). This method provides an SNA metric that can be calculated at the time the matched pattern is detected in order to rule out the benign pattern match 404 from the possibly threatening pattern match 402. The second method involves using SNAP to rank the detected matches in order to identify which matches are worth a second look by the user (or analyst). FIG. 5 shows that there are two communication paths from visitor "P2" to "bad guy" 509 or "suspected bad guy" 507 within input graph 500. Representing this relationship in a pattern using current technology is complicated for two reasons: (1) it overcomplicates the pattern, as there would be more nodes and edges required, and (2) there is no way with conventional implementation to be able to dynamically specify the number of links from the visitor (P2) to the "bad guy" 509.

Figure 6:
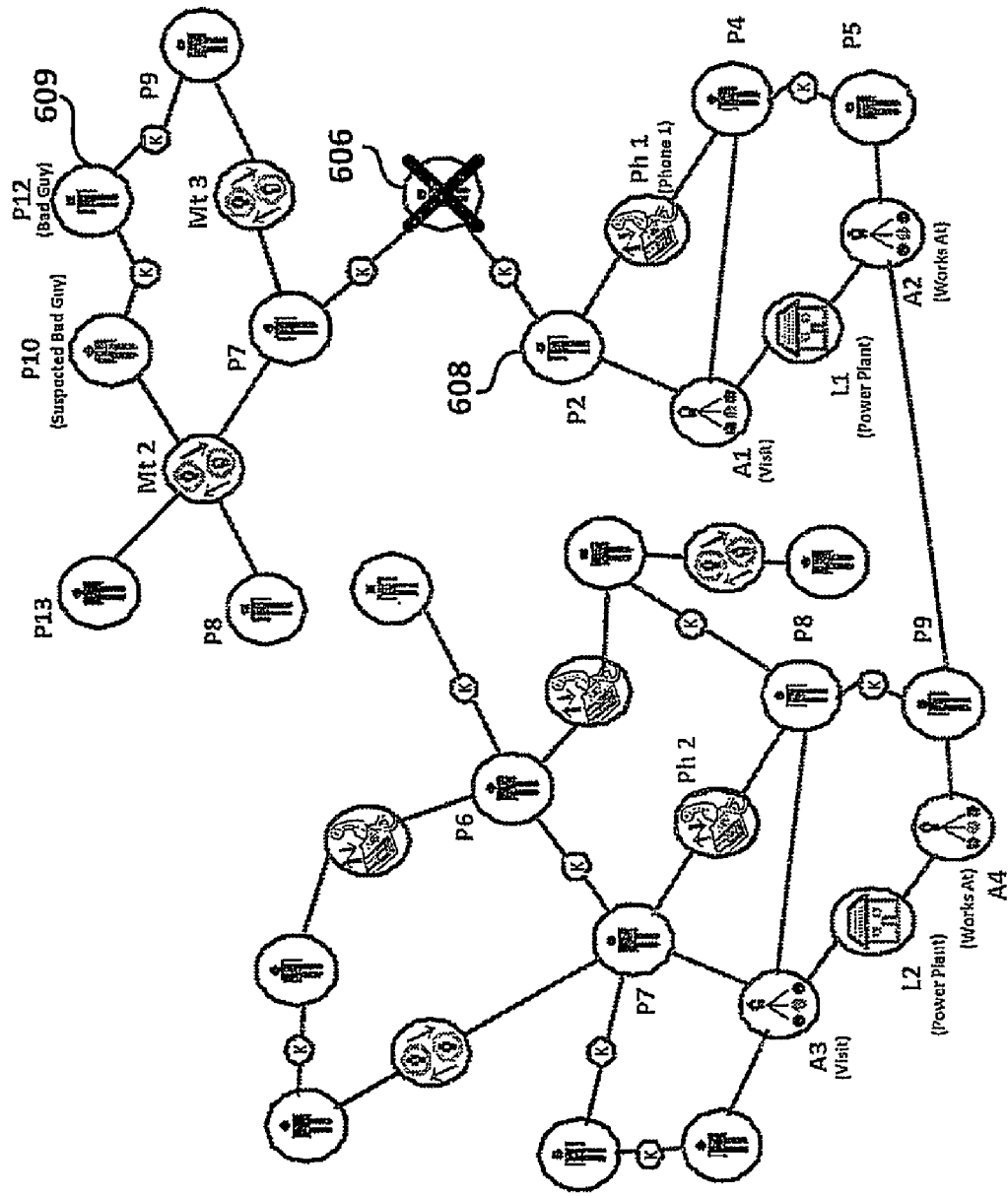
FIG. 6 illustrates the result when a primary or relevant intermediate node is eliminated from a communication link between the matched pattern and the node of interest, in accordance with one embodiment of the invention.

In one embodiment of the invention, as shown by FIG. 6, the user is able to specify that the intermediary 606 be a "cut-out." This type of analysis (role) is key in social network analysis as the individual that fulfills the intermediary role is critical in bridging the communication between two groups or between a node of interest and a matched group. FIG. 6 shows the network with the cutout node marked with an "X". The ability to further qualify the possible matches using SNA metrics and techniques adds a powerful mechanism to filter out the possibly benign matches, which can distract a user from focusing attention on the real threats.

Figure 8:
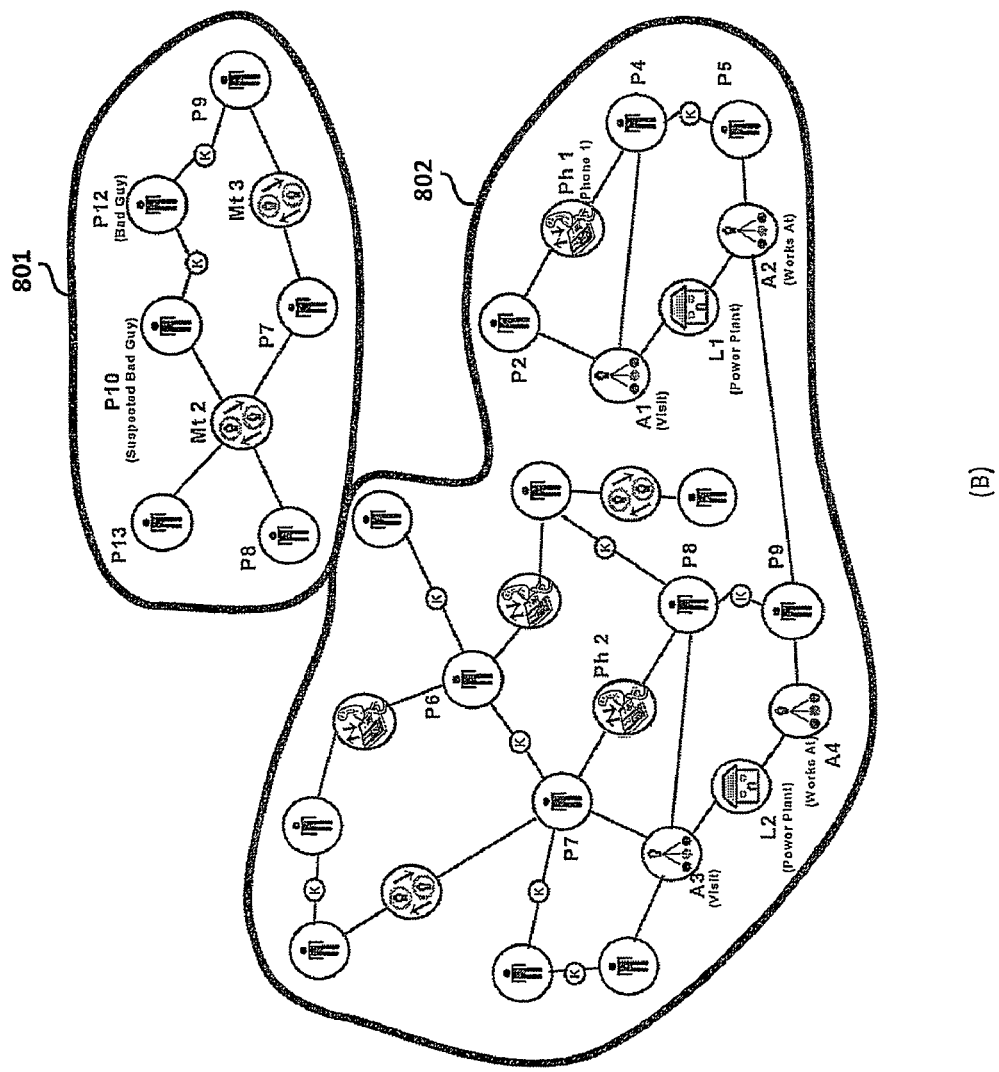
FIG. 8 illustrates the resulting, separated activity graphs produced following removal of the relevant intermediate node, according to one embodiment of the invention.

FIG. 8 then shows the resulting network. The user is able to quickly identify that if the intermediary 606 is removed, then the "bad guy" network 801 is separated from the benign network 802, as shown by FIGS. 6 and 8, which shows the separated, smaller networks after the cutout node (606) is identified and removed.

C. Integrating SNA Roles Into Pattern Matching

Figure 9:
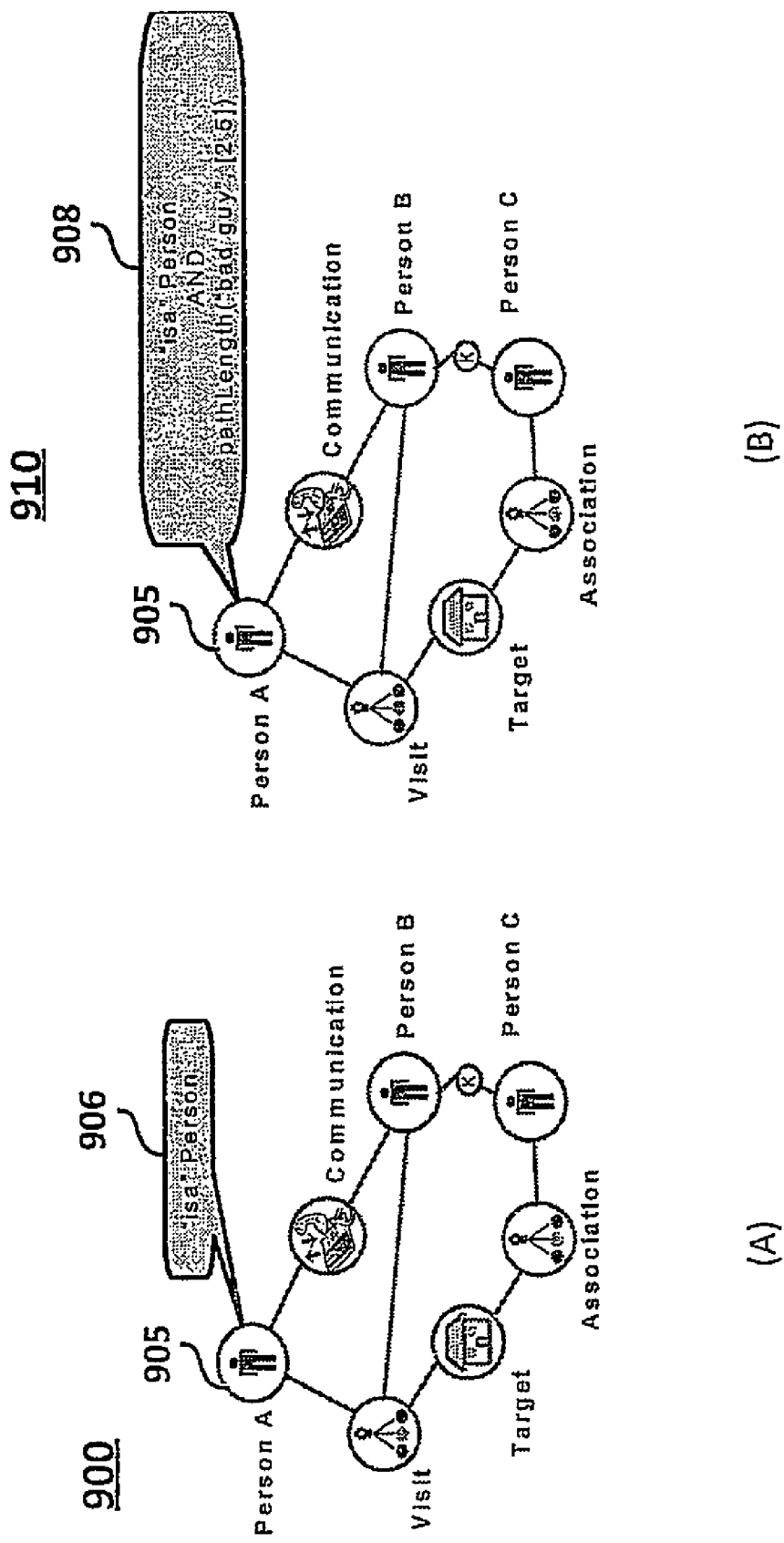
FIG. 9 illustrates the application of context to a graph pattern to determine conditions of interests, in according with an embodiment of the invention.

FIG. 9 illustrates one aspect of the basic framework for integrating SNA capability into graph matching algorithms, compared with the conventional graph matching technique. Specifically, FIG. 9 shows a before (conventional implementation of pattern graph description) and after (new implementation of pattern graph description) notional representation of how pattern matches are specified. As shown by pattern graph A 900 of FIG. 9, the conventional pattern match specifications for "Person A" 905 are that the node "isa Person" (906). Then, the only allowed specifications are predicates over the attributes of the node. In this example, the match specification is defined local to the node.

Figure 7:
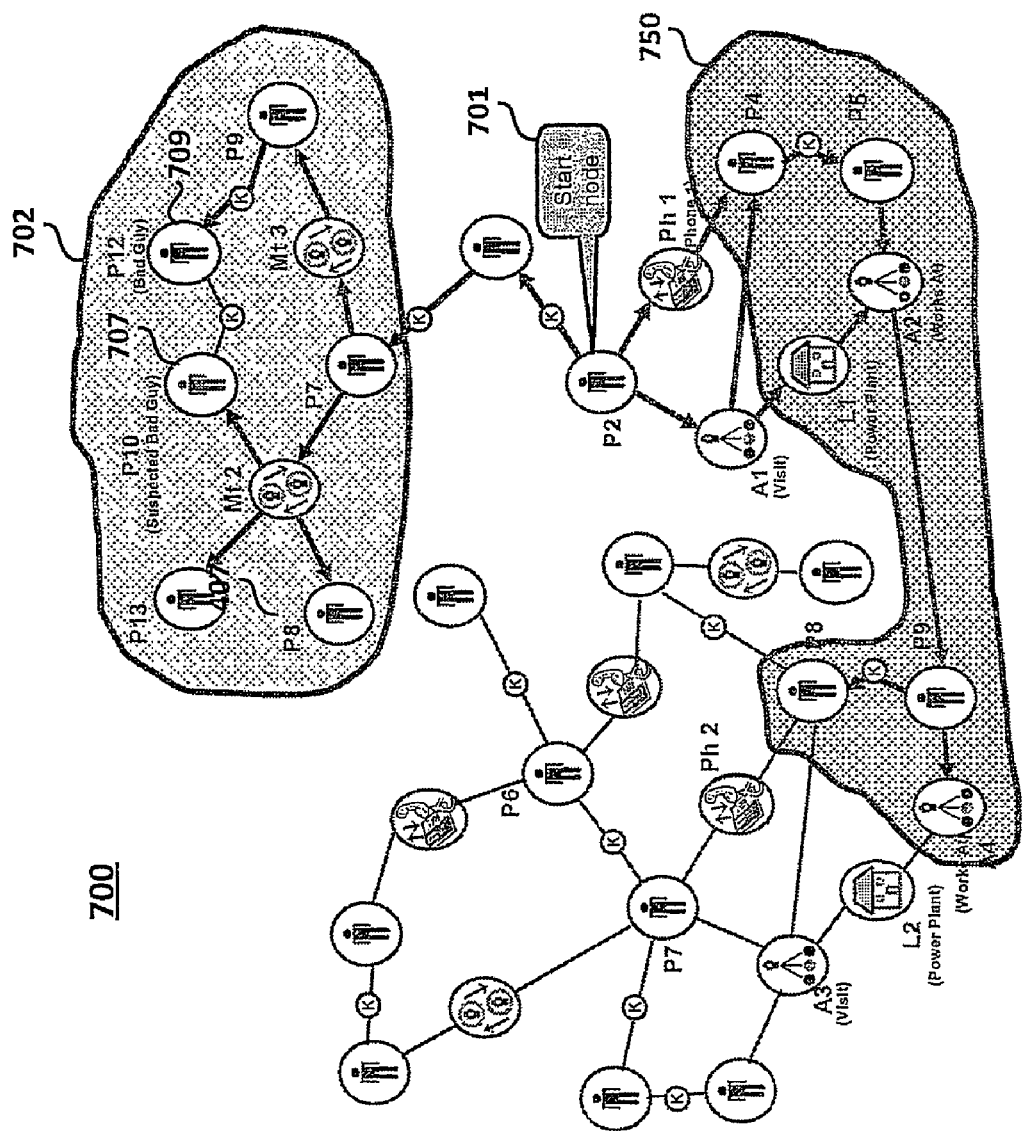
FIG. 7 illustrates an different method of identifying a central node within an input graph, in accordance with one embodiment of the invention.

The pattern match specifications for Person A 905 in pattern graph B 910 of FIG. 9 are "isa Person AND pathlength ("badguy", [2,5])" (908). As shown, in addition to local node attribute predicates, the approach of the illustrative embodiment includes SNA-based predicates defined over non-local information. In this notional example, the node "isa Person" AND must be at least 2, but not more than 5 "hops" or path lengths to a known "bad guy." The shaded regions of FIG. 7 show the inexact SNA metric calculation from the example where the user is only interested in path lengths at least 2 and no more than 5 from the matched node. Thus, from start node 701, only nodes within the specified path lengths (indicated by shaded areas 702 and 750) are of interest. This specification of path lengths limits the space of possible portions of the graph that the algorithm needs to search in order to find a "bad guy," substantially reducing the computation time.

With this modification, the benign visit 404 of FIG. 4 will not be matched to the pattern, while the suspect (threatening) visit 402 will be matched to the pattern and identified to the user. With this expansion of the graph matching provided by SNAP utility, the number of false positives returned to the user is substantially reduced, as a context of pre-specified interest is utilized to filter all matches prior to outputting the matches to the user.

Incorporating SNA metrics as part of the pattern matching specification provides additional input into the suspicion scoring of the match. Depending on the user's objectives, an SNA metric may increase or decrease the suspicion score of the match. A user may either use the SNA metric as an additional qualifier for suspicious activity, in which case the suspicion score would increase, or the user may use the SNA metric as a qualifier for benign activity, in which case the suspicion score would decrease.

D. Inexact SNA Metric Calculation

The approach provided by the described embodiments of the invention achieves scalability based on the recognition that in many cases calculating a precise SNA metric value is not necessary in order to make use of that metric in pattern matching. In the previously described example, the user is only interested in path lengths between 2 and 5, inclusive. As another example, the user maybe interested in the degree of centrality of a particular individual. Thus, it may be enough to know that the centrality measure is "more than 0.75." In this example, the algorithm only needs to perform the computations necessary to determine that an individual's centrality measure is high enough to be of interest. Once the threshold for the metric is exceeded, the computation is terminated. With such an implementation, the embodiments of the invention has the potential to save computation time, since calculating many SNA metrics may be computationally very expensive.

In one embodiment, the SNA metric calculations are augmented to handle the embodiments where the user only cares that a certain metric falls within some interval: e.g., [lower-bound, upper-bound], where lower-bound $\leq$ metric-value $\leq$ upper-bound. In most cases, the SNA metrics are monotonic, meaning that once the calculation falls within the interval, SNAP utility stops the computation. For example, the average path length of a node in a graph is a monotonic function. If the SNAP utility is looking for a maximum path length (interval [0 max-value]), using a breadth-first search, once the current average exceeds the specified max-value, the algorithm stops computing the metric.

Figure 10:
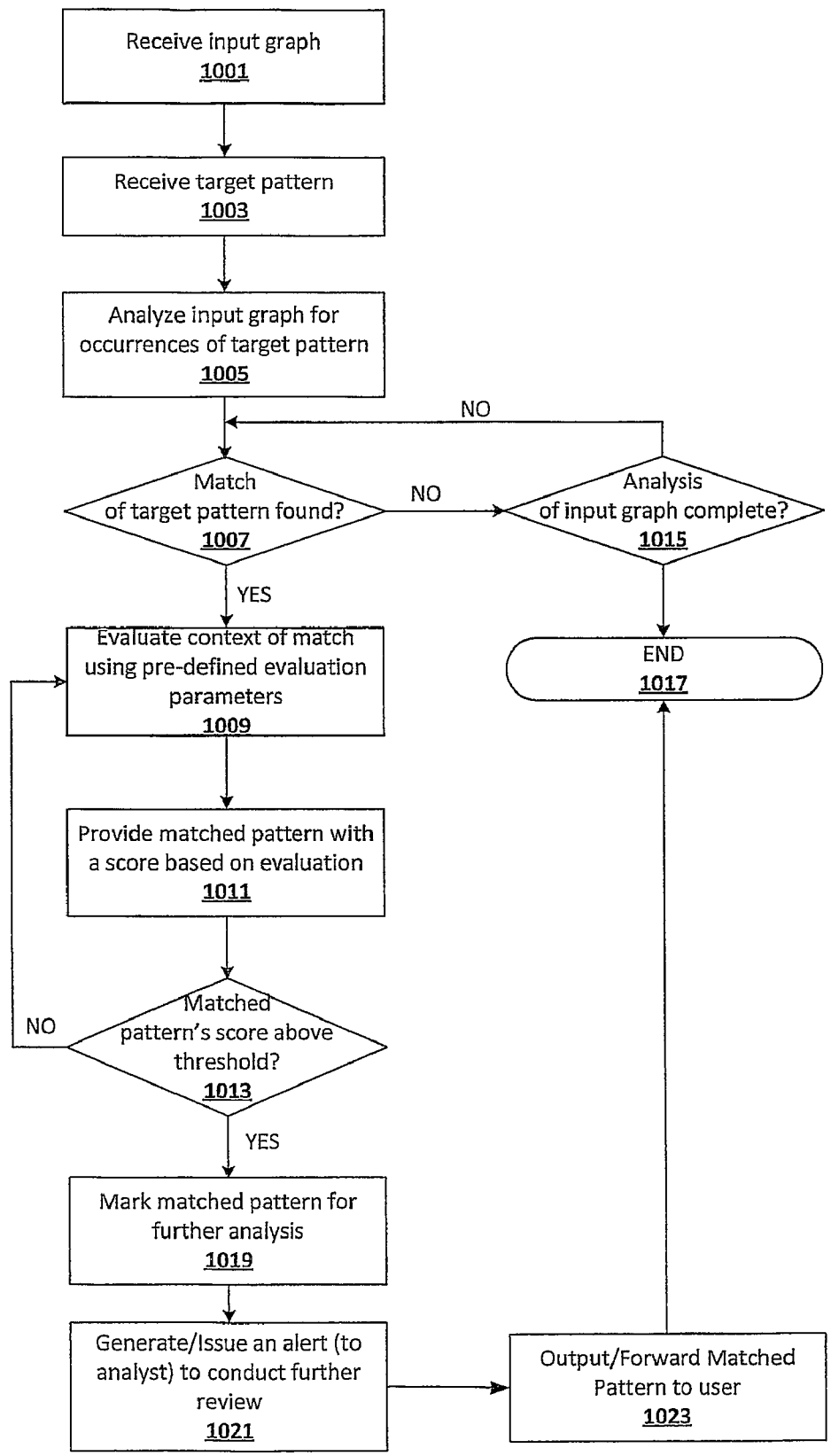
FIG. 10 is a flow chart illustrating the process for identifying social communications of interest (i.e., given particular, pre-established contexts) utilizing an input graph of a social network to match a pattern graph, in accordance with one embodiment of the invention.

FIG. 10 is a flow chart generally illustrating the method by which the SNAP utility completes various functional features of the invention, according to one embodiment. The process commences at block 1001, which illustrates the SNAP utility receiving an input graph representation of individuals/entities that communicate with each other. The SNAP utility also receives or accesses a target pattern (such as the type of pattern illustrated by FIG. 9(B)), which defines interconnectivity of interests, as shown at block 1003. Using the input graph and the target pattern, the SNAP utility evaluates the input graph for a match of the pattern graph at block 1005. That is the SNAP utility searches for and/or analyzes certain communication patterns to determine when the particular target pattern exists within the input graph. SNAP utility determines, at block 1007, whether a match is found within the input graph, and assuming a match is found, SNAP utility further evaluates the match against pre-defined conditions (or contexts) as shown at block 1009. Based on the evaluation, the matching pattern is identified within the input graph and provided a "score", as indicated at block 1011. The score assigned to the particular matching pattern ranks the pattern relative to other matching patterns based on the pre-defined conditions.

According to one embodiment, a threshold score is established, at which a matching patterns is identified as a pattern of interest. For example, on a scale of 1 to 10, only patterns having a score above 4 may be considered relevant for further review. Thus, all other patterns that score 4 or less are assumed to be "false" hits and are not relevant for further consideration by the user. It is understood that the use of a scale of 1 to 10 as well as the score of 4 as the threshold are provided solely by way of example. Different scales and different thresholds may be provided/utilized in other embodiments.

Returning to FIG. 10, a comparison of the score against the threshold is performed and a determination made at block 1013 whether the score for the particular pattern is above the threshold. When the score is at or below the threshold, the processor of checking the input graph for a match of the pattern of interest continues until the entire graph has been checked, as shown at block 1015. An exhaustive check of the input graph is completed and reveals all possible matches to the pattern of interest. The manner of checking the input graph may vary from one implementation to the other. Once the graph has been completely checked, as determined at block 1015, the process ends, as shown at block 1017.

In one embodiment, the identity (location within the input graph) of the matching patterns is stored in a database of found patterns. The match database may then be accessed by a user at a later time to perform additional evaluations or other functions with the matched patterns.

When the score is above the threshold, the SNAP utility marks the matched pattern as relevant (or important) for further analysis, as provided at block 1019. The SNAP utility then generates an alert which identifies the matched pattern of interest, as shown at block 1021. The matched pattern is then outputted (or forwarded) to the user/analyst for further review, as provided at block 1023.

Figure 11:
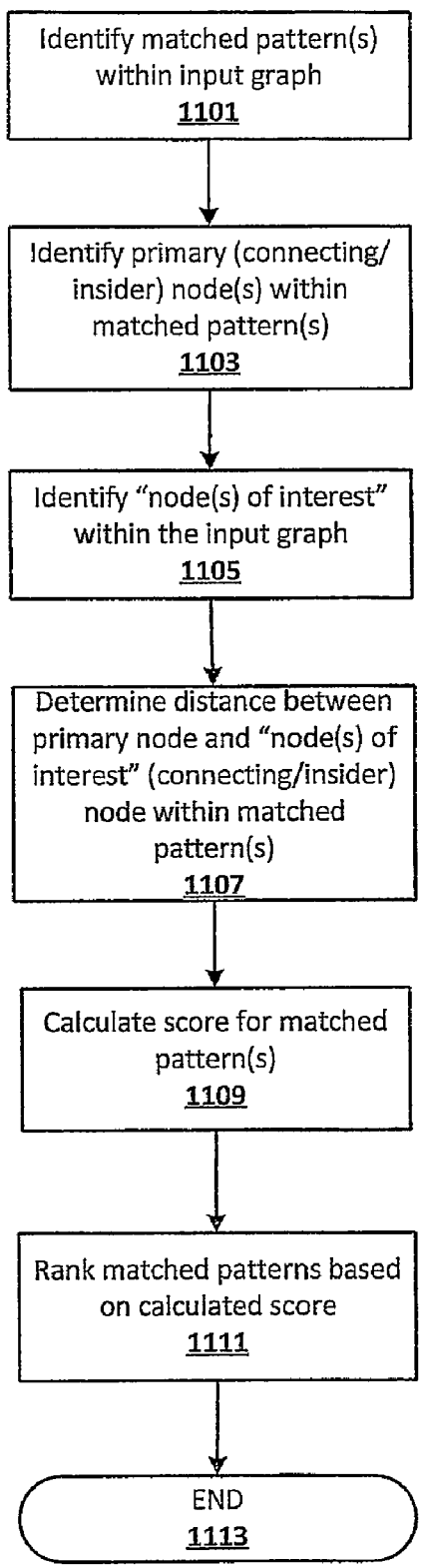
FIG. 11 is a flow chart illustrating the process for detecting matched patterns and calculating associated scores for the matched patterns detected, in accordance with one embodiment of the invention.

FIG. 11 is a flow chart, which illustrates, in specific details, the processing by SNAP utility in calculating the score for a matched pattern when the score is weighted in inverse proportion to the degree of separation between a primary node within the matched pattern and a next node (i.e., person) of interest within the general input graph. Within this example, scores range from 9-5 based on whether the primary node is within a range of 2-to-5 hops away from the particular node of interest. That is, when the primary node is only 2 hops away, the matched pattern is given a score of 9, while when the primary node is 5 hops away, the matched pattern is given a score of 6. Additionally, an added point may be provided if the edge connecting the primary node with the node of interest is a direct (versus an indirect) communication path. Thus, a cellular phone connection between two nodes increases the score, while a spam email shared between the nodes does not affect the score (or perhaps reduces the score).

Turning now to the figure, the process begins at block 1101 at which the matched pattern is identified. At block 1103, the SNAP utility also identifies the primary node within the matched pattern. Also, the SNAP utility identifies the nodes (persons) of interest within the input graph, as shown at block 1105. With both primary node and nodes of interest identified, SNAP utility then iterates through a series of checks, as shown at block 1107, to determine how far apart the two nodes actually are and other functionality associated with the edges connecting up the nodes (assuming a connecting is provided). The other functionality includes parameters that assist in providing a context for each link in the communication between the two nodes. A score is calculated during the iterative checks, as provided at block 1109, and the scores of the various matched patterns are ranked relative to the pre-set scale, as indicated at block 1111. The process then ends at block 1113.

In the flow charts above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

One embodiment of the described approach requires conducting an investigation on the properties of the metrics of interest, and correctly implementing algorithms to take advantage of these properties. This approach has the potential for reducing, by several orders of magnitude, the efficiency of calculating SNA metrics that have the ability of distinguishing suspicious and benign behavior.

The above description of the various embodiments provides a method, system and computer program product for initiating graph pattern matching within an input graph that represents a social network. The graph pattern matching utilizes pre-defined social network analysis (SNA) metrics to provide a context for finding a true match, and the graph pattern matching locates one or more matched graphs within the input graph having similar inter-connections among nodes as a target graph pattern. Each matched graph is analyzed using SNA metrics-based context from at least one of local node attributes within the matched graph and non-local node attributes, external to the matched graph, to determine when the matched graph is a true match.

One embodiment comprises: (1) assigning a weight to each matched graph based on a defined context, which defined context takes into consideration an inter-connection of the matched graph to one or more external nodes of interest within the larger input graph, wherein the weight indicates a relative importance of the matched graph within the defined context; (2) comparing the weight of each matched pattern against a pre-established threshold weight; (3) marking only matched patterns with a weight above the pre-established threshold weight as true matches, which may be relevant for further analysis; and (4) when an output/alert feature is provided within the graph pattern matching, generating an output/alert which identifies the matched patterns that are true matches.

Another embodiment comprises: (1) calculating a score for each matched graph identified; (2) ranking the score of each matched graph against a pre-established scale for ranking matched graphs; and (3) outputting a set of resulting matched graphs in order of the ranking using one of a first output scheme, a second output scheme, and a third output scheme wherein the first output schemes places a higher ranked match graph ahead of a lower ranked matched graph, the second output scheme outputs the matched graphs in reverse order to the first output scheme, and the third output scheme outputs only those matched graphs whose score is above a pre-established minimum score.

A next embodiment includes: (1) identifying a node of interest within the input graph, wherein the node of interest is one of a singular node or a node within a group of interconnected nodes, and wherein said node of interest is interconnected to other nodes within the social network via one or more interconnection means; (2) establishing a maximum path length as a first SNA metric that defines the context, wherein said path length represents a number of hops separating the node of interest from a specified node within a matched graph; (3) determining an actual path length between the node of interest and the specified node within each matched graph identified; and (4) selecting each matched graph whose path length is not greater than the maximum path length as a true match, wherein matched patterns whose path lengths are greater than the maximum path length are determined to be out-of-context matched graphs that were false positives. Accordingly, this embodiment enables searching only within the maximum path length of the node of interest to find the specified node; wherein the path length SNA metric is utilized to curtail and filter the matches of the target pattern graph to substantially reduce a number of false positives of matched graphs, which are located outside the path length within the input graph.

Another embodiment comprises: (1) defining an SNA metric of interest along with a pre-established tracking parameter, such as a threshold; (2) tracking the SNA metric at each step of completing the graph pattern matching; and (3) automatically terminating the graph pattern matching when a value of the pre-established tracking parameter exceeds a pre-set threshold for the SNA metric. Another embodiment provides: (1) providing a range within which a particular SNA metric falls, said range comprising a lower-bound and an upper-bound; (2) when the range represents an exclusion range, automatically terminating the graph pattern matching when the value for the particular SNA metric falls within the pre-established interval; and (3) when the range represents an inclusion range, automatically terminating the graph pattern matching when the value for the particular SNA metric falls outside the pre-established interval.

A next embodiment comprises: (1) performing an activity scoring of the matched pattern using SNA metric inputs, wherein said activity scoring increases or decreases an activity score of the matched pattern, the activity score indicating whether a matched pattern is a pattern of interest; and (2) when the activity is identified within the input graph: (a) increasing the activity score when the SNA metric is utilized as an additional qualifier for an activity desired to have a higher activity score; and (b) decreasing the activity score when the SNA metric is utilized as an additional qualifier for an activity desired to have a lower activity score.

As will be farther appreciated, the processes in the described embodiments of the present invention may be implemented using any combination of software, firmware or hardware. As a preparatory step to practicing the invention in software, the processor programming code (whether software or firmware) according to a preferred embodiment will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution. The method form of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

As a final matter, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method comprising:
   initiating graph pattern matching within an input graph that represents a social network, said graph pattern matching utilizing pre-defined social network analysis (SNA) metrics to provide a context for finding a true match, wherein the graph pattern matching locates one or more matched graphs within the input graph having similar inter-connections among nodes as a target graph pattern; and
   analyzing each matched graph using SNA metrics-based context from at least one of local node attributes within the matched graph and non-local node attributes, external to the matched graph, to determine when the matched graph is a true match.

2. The method of claim 1, wherein the analyzing further comprises:

assigning a weight to each matched graph based on a defined context, which defined context takes into consideration an inter-connection of the matched graph to one or more external nodes of interest within the larger input graph, wherein said weight indicates a relative importance of the matched graph within the defined context;

comparing the weight of each matched pattern against a pre-established threshold weight;

marking only matched patterns with a weight above the pre-established threshold weight as true matches, which may be relevant for further analysis; and when an output/alert feature is provided within the graph pattern matching, generating an output/alert which identifies the matched patterns that are true matches.

3. The method of claim 1, further comprising:
calculating a score for each matched graph identified;
ranking the score of each matched graph against a pre-established scale for ranking matched graphs; and
outputting a set of resulting matched graphs in order of said ranking using one of a first output scheme, a second output scheme, and a third output scheme, wherein the first output schemes places a higher ranked match graph ahead of a lower ranked matched graph, the second output scheme outputs the matched graphs in reverse order to the first output scheme, and the third output scheme outputs only those matched graphs whose score is above a pre-established minimum score.

4. The method of claim 1, further comprising:
identifying a node of interest within the input graph, wherein the node of interest is one of a singular node or a node within a group of interconnected nodes, and wherein said node of interest is inter-connected to other nodes within the social network via one or more inter-connection means;
establishing a maximum path length as a first SNA metric that defines the context, wherein said path length represents a number of hops separating the node of interest from a specified node within a matched graph;
determining an actual path length between the node of interest and the specified node within each matched graph identified; and
selecting each matched graph whose path length is not greater than the maximum path length as a true match, wherein matched patterns whose path lengths are greater than the maximum path length are determined to be out-of-context matched graphs that were false positives.

5. The method of claim 4, further comprising:
searching only within the maximum path length of the node of interest to find the specified node;
wherein the path length SNA metric is utilized to curtail and filter the matches of the target pattern graph to substantially reduce a number of false positives of matched graphs, which are located outside the path length within the input graph.

6. The method of claim 1, further comprising:
identifying an intermediary node that may be neutralized to remove a connection between a first matched pattern and the node of interest, wherein the intermediary node bridges communication between a group represented by the first matched pattern and the node of interest.

7. The method of claim 1, wherein said context comprises one or more SNA metrics including: SNA metric intervals, which provides at least one of a maximum range and a minimum range from a specified node within which to constrain and focus a search for the matched graphs; average cycle length; average path length; centrality measures; circumference; clique measures; clustering measures; degree; density; diameter; girth; number of nodes; radius; and radiality.

8. The method of claim 1, further comprising:
defining an SNA metric of interest along with a pre-established tracking parameter, such as a threshold;
tracking the SNA metric at each step of completing the graph pattern matching; and
automatically terminating the graph pattern matching when a value of the pre-established tracking parameter exceeds a pre-set threshold for the SNA metric.

9. The method of claim 1, farther comprising:
providing a range within which a particular SNA metric falls, said range comprising a lower-bound and an upper-bound;
when the range represents an exclusion range, automatically terminating the graph pattern matching when the value for the particular SNA metric falls within the pre-established interval; and
when the range represents an inclusion range, automatically terminating the graph pattern matching when the value for the particular SNA metric falls outside the pre-established interval.

10. The method of claim 1, wherein initiating graph pattern matching further comprises:
integrating pre-defined SNA constructs, including groups, into the graph pattern matching, wherein, group membership is accounted for when utilizing SNA metrics to define the match criteria, wherein a match predicate is defined that requires a matched node be a member of a group with certain characteristics;
defining an SNA group that comprises one or more nodes having pre-defined inter-connection characteristics; and
completing the graph pattern matching utilizing the SNA groups as one component of the context.

11. The method of claim 1, further comprising one or more of:
defining a particular social role within the social network as a gatekeeper, based on a connection of person, events and activities to a node representing the gatekeeper; and
defining roles for particular nodes within the input graph, including: a first role, which represents a known entity exhibiting certain known characteristics/tendencies and intentions; a second role, which represents an entity that has some kind of association with a target node; and a third role, which represents a next entity that is connected to entities representing both the first role and the second role.

12. The method of claim 11, further comprising:
matching nodes against certain SNA roles and positions when completing the graph matching, wherein the nodes include nodes representing entities with high centrality measures, communication gateways, cut-outs, and reach-ability to other particular entities of interest; and
analyzing a node within the input graph against a select node within a target pattern graph using the pre-determined SNA metric to determine if the node in the input graph matches the select node in the target pattern graph.

13. The method of claim 1, further comprising:
performing an activity scoring of the matched pattern using SNA metric inputs, wherein said activity scoring increases or decreases an activity score of the matched pattern, said activity score indicating whether a matched pattern is a pattern of interest; and
when the activity is identified within the input graph:
increasing the activity score when the SNA metric is utilized as an additional qualifier for an activity desired to have a higher activity score; and decreasing the activity score when the SNA metric is utilized as an additional qualifier for an activity desired to have a lower activity score.

14. The method of claim 1, further comprising:
determining a degree of centrality of a particular node using a centrality measure;
comparing the degree of centrality against a pre-established threshold value;
tagging the node as a node of interest when the degree of centrality of the particular node is above the pre-established threshold.

15. A computer program product comprising:
a non-transitory computer readable medium; and
program code on the non-transitory computer readable medium that when executed provides the functions of:
initiating graph pattern matching within an input graph that represents a social network, said graph pattern matching utilizing pre-defined social network analysis (SNA) metrics to provide a context for finding a true match, wherein the graph pattern matching locates one or more matched graphs within the input graph having similar inter-connections among nodes as a target graph pattern; and
analyzing each matched graph using SNA metrics-based context from at least one of local node attributes within the matched graph and non-local node attributes, external to the matched graph, to determine when the matched graph is a true match.

16. The computer program product of claim 15, wherein the program instructions for analyzing further comprises program instructions for:
assigning a weight to each matched graph based on a defined context, which defined context takes into consideration an inter-connection of the matched graph to one or more external nodes of interest within the larger input graph, wherein said weight indicates a relative importance of the matched graph within the defined context;
comparing the weight of each matched pattern against a pre-established threshold weight;
marking only matched patterns with a weight above the pre-established threshold weight as true matches, which may be relevant for further analysis; and
when an output/alert feature is provided within the graph pattern matching, generating an output/alert which identifies the matched patterns that are true matches.

17. The computer program product of claim 15, further comprising program instructions for:
calculating a score for each matched graph identified;
ranking the score of each matched graph against a pre-established scale for ranking matched graphs; and
outputting a set of resulting matched graphs in order of said ranking using one of a first output scheme, a second output scheme, and a third output scheme, wherein the first output schemes places a higher ranked match graph ahead of a lower ranked matched graph, the second output scheme outputs the matched graphs in reverse order to the first output scheme, and the third output scheme outputs only those matched graphs whose score is above a pre-established minimum score.

18. The computer program product of claim 15, further comprising program instructions for:
identifying a node of interest within the input graph, wherein the node of interest is one of a singular node or a node within a group of interconnected nodes, and wherein said node of interest is inter-connected to other nodes within the social network via one or more inter-connection means;
establishing a maximum path length as a first SNA metric that defines the context, wherein said path length represents a number of hops separating the node of interest from a specified node within a matched graph;
determining an actual path length between the node of interest and the specified node within each matched graph identified; and
selecting each matched graph whose path length is not greater than the maximum path length as a true match, wherein matched patterns whose path lengths are greater than the maximum path length are determined to be out-of-context matched graphs that were false positives.

19. The computer program product of claim 18, further comprising program instructions for:
searching only within the maximum path length of the node of interest to find the specified node;
wherein the path length SNA metric is utilized to curtail and filter the matches of the target pattern graph to substantially reduce a number of false positives of matched graphs, which are located outside the path length within the input graph.

20. The computer program product of claim 15, further comprising program instructions for:
identifying an intermediary node that may be neutralized to remove a connection between a first matched pattern and the node of interest, wherein the intermediary node bridges communication between a group represented by the first matched pattern and the node of interest.

21. The computer program product of claim 15, wherein said context comprises one or more SNA metrics including: SNA metric intervals, which provides at least one of a maximum range and a minimum range from a specified node within which to constrain and focus a search for the matched graphs; average cycle length; average path length; centrality measures; circumference; clique measures; clustering measures; degree; density; diameter; girth; number of nodes; radius; and radiality.

22. The computer program product of claim 15, further comprising program instructions for:
defining an SNA metric of interest along with a pre-established tracking parameter, such as a threshold;
tracking the SNA metric at each step of completing the graph pattern matching; and
automatically terminating the graph pattern matching when a value of the pre-established tracking parameter exceeds a pre-set threshold for the SNA metric.

23. The computer program product of claim 15, further comprising program instructions for:
providing a range within which a particular SNA metric falls, said range comprising a lower-bound and an upper-bound;
when the range represents an exclusion range, automatically terminating the graph pattern matching when the value for the particular SNA metric falls within the pre-established interval; and
when the range represents an inclusion range, automatically terminating the graph pattern matching when the value for the particular SNA metric falls outside the pre-established interval.

24. The computer program product of claim 15, wherein said program instructions for initiating graph pattern matching further comprises program instructions for:
integrating pre-defined SNA constructs, including groups, into the graph pattern matching, wherein, group membership is accounted for when utilizing SNA metrics to define the match criteria, wherein a match predicate is defined that requires a matched node be a member of a group with certain characteristics;

defining an SNA group that comprises one or more nodes having pre-defined inter-connection characteristics; and completing the graph pattern matching utilizing the SNA groups as one component of the context.

25. The computer program product of claim 15, further comprising program instructions for one or more of:

defining a particular social role within the social network as a gatekeeper, based on a connection of person, events and activities to a node representing the gatekeeper; and defining roles for particular nodes within the input graph, including: a first role, which represents a known entity exhibiting certain known characteristics/tendencies and intentions; a second role, which represents an entity that has some kind of association with a target node; and a third role, which represents a next entity that is connected to entities representing both the first role and the second role.

26. The computer program product of claim 25, further comprising program instructions for:

matching nodes against certain SNA roles and positions when completing the graph matching, wherein the nodes include nodes representing entities with high centrality measures, communication gateways, cut-outs, and reach-ability to other particular entities of interest; and analyzing a node within the input graph against a select node within a target pattern graph using the pre-determined SNA metric to determine if the node in the input graph matches the select node in the target pattern graph.

27. The computer program product of claim 15, further comprising program instructions for:

performing an activity scoring of the matched pattern using SNA metric inputs, wherein said activity scoring increases or decreases an activity score of the matched pattern, said activity score indicating whether a matched pattern is a pattern of interest; and when the activity is identified within the input graph:
increasing the activity score when the SNA metric is utilized as an additional qualifier for an activity desired to have a higher activity score; and
decreasing the activity score when the SNA metric is utilized as an additional qualifier for an activity desired to have a lower activity score.

28. The computer program product of claim 15, further comprising program instructions for:

determining a degree of centrality of a particular node using a centrality measure;

comparing the degree of centrality against a pre-established threshold value;

tagging the node as a node of interest when the degree of centrality of the particular node is above the pre-established threshold.

29. The computer program product of claim 15, further comprising program instructions for:

generating a viewable interface having therein selectable options, which interface enables setup, interaction and manipulation of the SNA processing with SNA metrics providing the context; and generating, in user-understandable format, an output of the matched patterns that are true matches according to the provided context.

30. A system comprising:
a processor;
a memory operatively connected to the processor; and
a utility executing on the processor and which provides program means for:

initiating graph pattern matching within an input graph that represents a social network, said graph pattern matching utilizing pre-defined social network analysis (SNA) metrics to provide a context for finding a true match, wherein the graph pattern matching locates one or more matched graphs within the input graph having similar inter-connections among nodes as a target graph pattern; and analyzing each matched graph using SNA metrics-based context from at least one of local node attributes within the matched graph and non-local node attributes, external to the matched graph, to determine when the matched graph is a true match.

31. The system of claim 30, wherein the program means for analyzing further comprises program means for:

assigning a weight to each matched graph based on a defined context, which defined context takes into consideration an inter-connection of the matched graph to one or more external nodes of interest within the larger input graph, wherein said weight indicates a relative importance of the matched graph within the defined context;

comparing the weight of each matched pattern against a pre-established threshold weight;

marking only matched patterns with a weight above the pre-established threshold weight as true matches, which may be relevant for further analysis; and when an output/alert feature is provided within the graph pattern matching, generating an output/alert which identifies the matched patterns that are true matches.

32. The system of claim 30, further comprising program means for:

calculating a score for each matched graph identified;

ranking the score of each matched graph against a pre-established scale for ranking matched graphs; and outputting a set of resulting matched graphs in order of said ranking using one of a first output scheme, a second output scheme, and a third output scheme, wherein the first output schemes places a higher ranked match graph ahead of a lower ranked matched graph, the second output scheme outputs the matched graphs in reverse order to the first output scheme, and the third output scheme outputs only those matched graphs whose score is above a pre-established minimum score.

33. The system of claim 30, further comprising program means for:

identifying a node of interest within the input graph, wherein the node of interest is one of a singular node or a node within a group of interconnected nodes, and wherein said node of interest is inter-connected to other nodes within the social network via one or more inter-connection means;

establishing a maximum path length as a first SNA metric that defines the context, wherein said path length represents a number of hops separating the node of interest from a specified node within a matched graph;

determining an actual path length between the node of interest and the specified node within each matched graph identified; and selecting each matched graph whose path length is not greater than the maximum path length as a true match, wherein matched patterns whose path lengths are greater than the maximum path length are determined to be out-of-context matched graphs that were false positives.

34. The system of claim 33, further comprising program means for:

searching only within the maximum path length of the node of interest to find the specified node;

wherein the path length SNA metric is utilized to curtail and filter the matches of the target pattern graph to substantially reduce a number of false positives of matched graphs, which are located outside the path length within the input graph.

35. The system of claim 30, further comprising program means for:

identifying an intermediary node that may be neutralized to remove a connection between a first matched pattern and the node of interest, wherein the intermediary node bridges communication between a group represented by the first matched pattern and the node of interest.

36. The system of claim 30, wherein said context comprises one or more SNA metrics including: SNA metric intervals, which provides at least one of a maximum range and a minimum range from a specified node within which to constrain and focus a search for the matched graphs; average cycle length; average path length; centrality measures; circumference; clique measures; clustering measures; degree; density; diameter; girth; number of nodes; radius; and radiality.

37. The system of claim 30, further comprising program means for:

defining an SNA metric of interest along with a pre-established tracking parameter, such as a threshold;

tracking the SNA metric at each step of completing the graph pattern matching; and automatically terminating the graph pattern matching when a value of the pre-established tracking parameter exceeds a pre-set threshold for the SNA metric.

38. The system of claim 30, further comprising program means for:

providing a range within which a particular SNA metric falls, said range comprising a lower-bound and an upper-bound;

when the range represents an exclusion range, automatically terminating the graph pattern matching when the value for the particular SNA metric falls within the pre-established interval; and when the range represents an inclusion range, automatically terminating the graph pattern matching when the value for the particular SNA metric falls outside the pre-established interval.

39. The system of claim 30, wherein said program means for initiating graph pattern matching further comprises program means for:

integrating pre-defined SNA constructs, including groups, into the graph pattern matching, wherein, group membership is accounted for when utilizing SNA metrics to define the match criteria, wherein a match predicate is defined that requires a matched node be a member of a group with certain characteristics;

defining an SNA group that comprises one or more nodes having pre-defined inter-connection characteristics; and completing the graph pattern matching utilizing the SNA groups as one component of the context.

40. The system of claim 30, further comprising program means for one or more of:

defining a particular social role within the social network as a gatekeeper, based on a connection of person, events and activities to a node representing the gatekeeper; and defining roles for particular nodes within the input graph, including: a first role, which represents a known entity exhibiting certain known characteristics/tendencies and intentions; a second role, which represents an entity that has some kind of association with a target node; and a third role, which represents a next entity that is connected to entities representing both the first role and the second role.

41. The system of claim 40, further comprising program means for:

matching nodes against certain SNA roles and positions when completing the graph matching, wherein the nodes include nodes representing entities with high centrality measures, communication gateways, cut-outs, and reach-ability to other particular entities of interest; and analyzing a node within the input graph against a select node within a target pattern graph using the pre-determined SNA metric to determine if the node in the input graph matches the select node in the target pattern graph.

42. The system of claim 30, further comprising program means for:

performing an activity scoring of the matched pattern using SNA metric inputs, wherein said activity scoring increases or decreases an activity score of the matched pattern, said activity score indicating whether a matched pattern is a pattern of interest; and when the activity is identified within the input graph:

increasing the activity score when the SNA metric is utilized as an additional qualifier for an activity desired to have a higher activity score; and decreasing the activity score when the SNA metric is utilized as an additional qualifier for an activity desired to have a lower activity score.

43. The system of claim 30, further comprising program means for:

determining a degree of centrality of a particular node using a centrality measure;

comparing the degree of centrality against a pre-established threshold value;

tagging the node as a node of interest when the degree of centrality of the particular node is above the pre-established threshold.

44. The system of claim 30, further comprising program means for:

generating a viewable interface having therein selectable options, which interface enables setup, interaction and manipulation of the SNA processing with SNA metrics providing the context; and generating, in user-understandable format, an output of the matched patterns that are true matches according to the provided context.

* * * * *